O. W. YOUNG.
PISTON VALVE.
APPLICATION FILED JAN. 13, 1915.

1,223,336.

Patented Apr. 17, 1917.
2 SHEETS—SHEET 1.

WITNESSES:
Bessie S. Rice
Minnie M. Landeman

INVENTOR
Otis W. Young.
BY
Parker & Carter
HIS ATTORNEYS

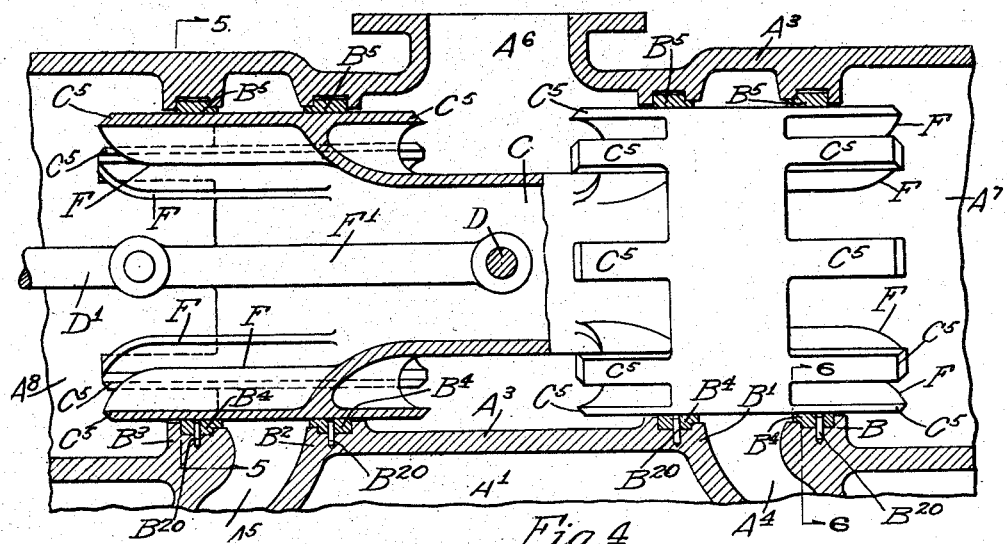
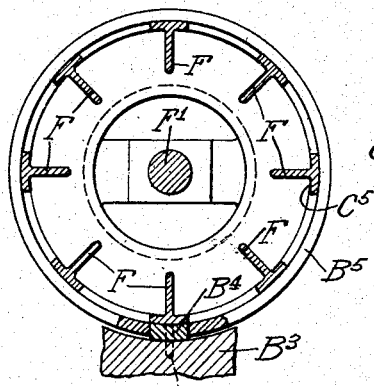
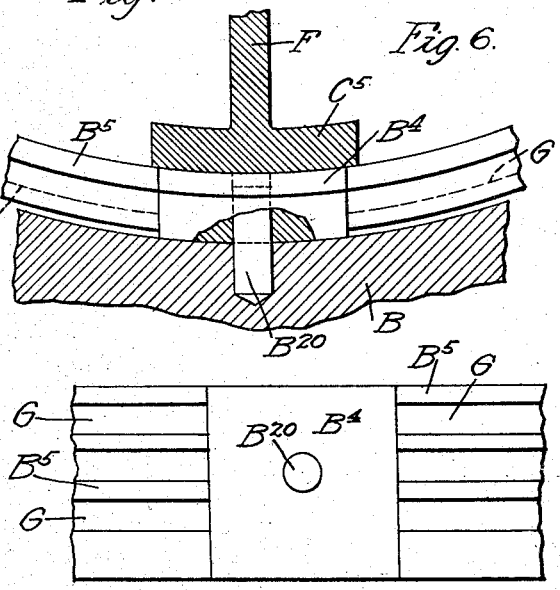
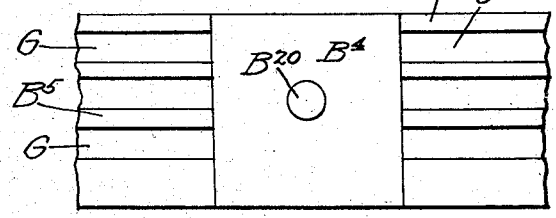
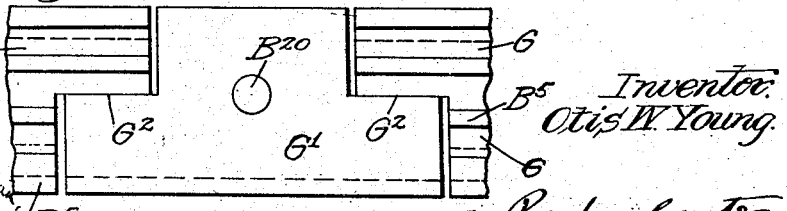

dd
UNITED STATES PATENT OFFICE.

OTIS W. YOUNG, OF CHICAGO, ILLINOIS, ASSIGNOR TO PYLE-NATIONAL ELECTRIC HEADLIGHT COMPANY, OF CHICAGO, ILLINOIS, A CORPORATION OF NEW JERSEY.

PISTON-VALVE.

1,223,336.  Specification of Letters Patent. Patented Apr. 17, 1917.

Application filed January 13, 1915. Serial No. 1,934.

*To all whom it may concern:*

Be it known that I, OTIS W. YOUNG, a citizen of the United States, residing at Chicago, in the county of Cook and State of Illinois, have invented a certain new and useful Improvement in Piston-Valves, of which the following is a specification.

My invention relates to valves and is applicable for many situations in which valves are used for the purpose of controlling or distributing the flow of fluid. It is more or less diagrammatically illustrated in the accompanying drawings under a number of alternate forms and modifications for the purpose of showing its adaptability to steam engine distribution valves and more particularly to locomotive engines using valves of considerable size, but I wish it clearly understood that these illustrations merely show one of many practical applications of the invention I claim.

It is my belief that in all cases where packing rings are used between valves and their cages, it has heretofore been the invariable custom to recess the rings into the valve and cause the rings to partake of the valve movement. One novel feature of my invention is the removal of the packing rings from the valve by recessing them into the cage or cylinder wall and provide sliding contact between the rings and valve. Among the advantages thus obtained is the lightening of the moving members approximately 50 per cent. and substituting compression instead of expansion rings. It will be readily understood from the illustrations that if the rings about the bearing block with slight clearance between the divided ends of the rings and the block at the time of installation, a slight wear between the rings and valve will dissipate the clearance and convert the valve into a plug valve with the decided advantage over all other forms of plug valve that its encircling contact is elastically expansion and positive proof against seizing or cutting.

Among other objects of my invention peculiarly important in connection with locomotive steam engine practice but, of course, important in any valve field are to provide a light, accurate piston valve which may be cheaply and easily manufactured and assembled, which may be easily handled by the valve gear, which will be accurate when first installed and retain its accuracy and which will result in improved operation of the locomotive in general. Other objects of my invention will appear from time to time in the specification. The invention is illustrated in the accompanying drawings, wherein—

Fig. 4 is a section through the valve chest showing the modified form of valve part in section and part in elevation;

Fig. 5 is a section through said modified valve and compression ring;

Fig. 6 is an enlarged elevation of a portion of the compression ring and bearing block showing other parts in section;

Fig. 7 is a plan view of said ring and block; and

Fig. 8 is a plan view of a modified form of ring and block.

Like parts are indicated by like letters throughout the several figures.

A is the cylinder wall surrounded by the steam jacket $A^1$ and having mounted for reciprocation therein the steam engine piston $A^2$. $A^3$, $A^3$ are the walls of the valve chest. $A^4$, $A^5$ are passages leading from the valve or steam chest to the cylinder one on either side of the piston. I have preferably for the sake of convenience illustrated my invention as applied to an inside admission valve and accordingly it will be understood that $A^6$ discharging to the center of the valve chest is the dry pipe from the engine and it will be understood that the discharge from the cylinders passes into the discharge pipe or into the atmosphere or any suitable means not here illustrated through the exhaust ends $A^7$, $A^8$.

B, $B^1$, $B^2$ and $B^3$ are annular rings or ribs on the inside of the steam chest circularly arranged one on either side of the passages $A^4$, $A^5$. They are annularly slotted as indicated and each one contains at its bottom or lowest point a substantially rectangular block B⁴ pinned in position. Located within each of these slots and having its ends on each side of the rectangular bearing block B⁴ is a compression ring B⁵. This compression ring is of such diameter and such shape that it tends to yieldingly clamp the two piston sleeves B⁶, B⁷. It will be noted that there is a clearance between the inside of the ring and the bottom of the slot and that the ring is free to float in the slot and clamp the piston sleeves and that the ring is held only against rotation by the bearing block at the bottom and against longitudinal movement by the walls of the slot, which loosely contact it.

C is a dumb-bell shaped piston barrel small at the center and enlarging at its ends to support one at either end the piston sleeves B⁶, B⁷. These piston sleeves are ported as at C¹, C², C³ and C⁴ and it will be noted that the distance between the adjacent edges of the ports C¹, C², C³ and C⁴ is equal to the lap and lead dimension exactly as is the distance between the outer edges of the piston rings of the ordinary well-known type of piston valve equal to the same dimension. The ports are of such size that when they are completely in register with the passages A⁴, A⁵ these passages are completely open being closed only by comparatively thin ribs or bars C⁵ separating the different ports. These ribs or bars carry aprons or collars C⁶, C⁷ which terminate and complete the piston sleeve.

D is a wrist pin centrally located in the narrow portion of the piston barrel or dumb-bell. D¹ is the valve stem rod pivoted on the wrist pin D. This valve stem rod passes out through the wall of the housing in any usual way not here shown and is actuated by any valve gear not here illustrated as it forms no part of my invention.

Figure 1:
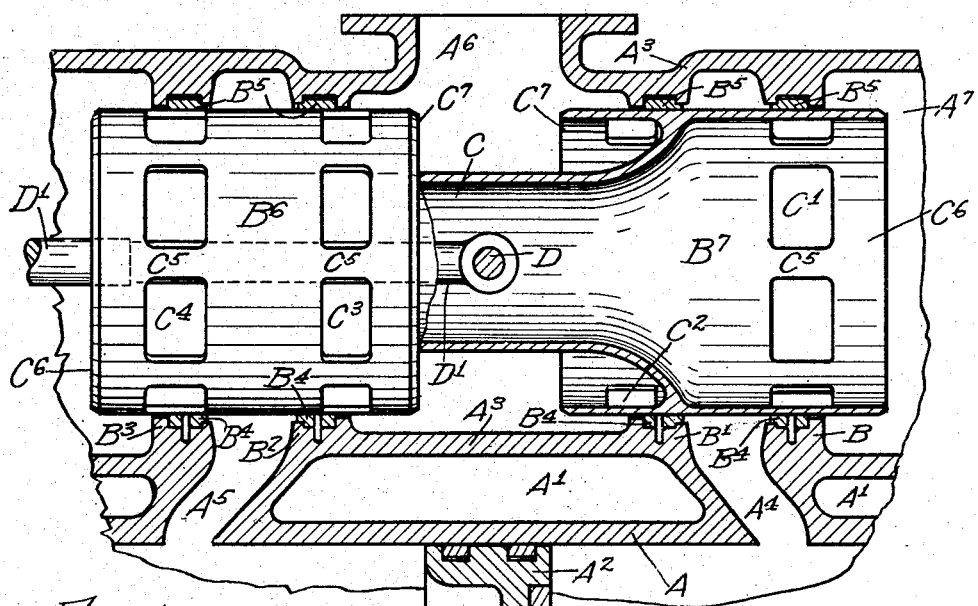
Figure 1 is a section through the valve chest showing the valve part in section and part in elevation.
Figure 2:
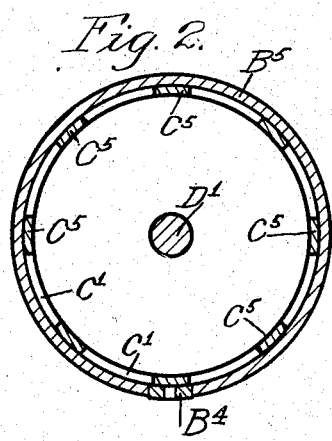
Fig. 2 is a section through the valve sleeve and one of the compression rings.
Figure 3:
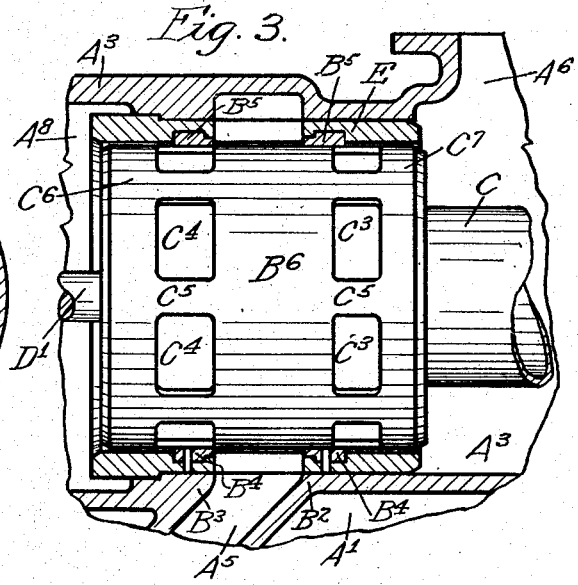
Fig. 3 is a detailed section showing the modified seat and the valve in elevation.

In the modified form shown in Fig. 3, E is a sleeve or valve sear sleeve thrust into the chest and carrying the same rings shown in the preferred form in Fig. 1. In each case it will be understood that the ring forms the bounding line between the live steam on the working side and the passages to the cylinder and between the exhaust side and the steam passages to the cylinder and the same result is obtained both in Figs. 1 and 3 the difference being merely one of assembly and manufacture. In the modified form shown in Fig. 4, the aprons or collars C⁶ are omitted and the bars or arms C⁵ are reinforced by the reinforcing ribs F. These reinforcing ribs extend in either direction from the bell-shaped end of the piston barrel and reinforce the fingers between the ports so as to resist pressure of the compression rings and prevent breaking of the fingers. In this arrangement the link F¹ is pivoted at one end on the wrist pin D and at the other end the knuckle joint on the valve stem which in this case is cut off short of the center of the valve.

In Figs. 6 and 7 is shown more clearly the arrangement of the piston ring and bearing block B⁴ which is pinned in position and has a curved surface to form a bearing or slide for the piston sleeves. This block is thicker than the depth of the curved surface and it will be noted that the compression rings B⁵ are so arranged that they tend to clamp at either end the sides of this block and project above the bottom of the groove so that as the piston or sleeve is in position it rides upon this bearing block being in every way free from any other contact and the compression ring being free to slide up and down with respect to the block follows the contour of the cylindrical sleeve perfectly.

G, G are the well-known type of condensation grooves in the effective working surface of the compression rings. It will be noted that there is clearance behind these rings so that the steam pressure may assist the normal tension of the ring and clamp it on the ring.

Fig. 8 is shown wherein the bearing block takes a T shape as at G¹ and wherein the ends of the piston ring are mitered so as to give a constant sliding joint G² between the ends of the block. Thus the ring can contract and expand in a large distance without breaking the continuity of the steam tight joint.

It will be evident that while I have shown in my drawings an operative device, still many changes might be made both in size, shape and arrangement of parts without departing from the spirit of my invention and I wish, therefore, that my drawings be regarded as in a sense diagrammatic.

The use and operation of my invention are as follows:—

When my valve is to be applied to the engine built for the purpose the form in Fig. 1 is used; when applied to the ordinary type of piston valve with the rings in the piston instead of in the housing the sleeve shown in Fig. 3 is used. In either case the rings are at rest one on either side leading from the valve chest to the cylinder and these rings instead of being expansion rings pressing against the walls of the housing or chest are compression rings loosely carried in the slots of the housing and compressing the valve sleeves. The valve sleeve is reciprocated in the usual manner by the valve gear and slides back and forth to carry out the normal distribution of a valve opening first one port and then the other, connecting first one side and the other with the live steam and the exhaust passage alternately.

Since these rings are gripping the piston sleeve, it is obvious that they must be kept in contact with the sleeve and so while only the piston sleeves extending between the two closed sides of the two groups is important for distribution the fingers or arms and collars or aprons extending on either side of the piston sleeve are essential to keep the piston rings always in position since were they allowed to contract to a smaller diameter it would resist the reciprocation of the piston valve. I have shown two forms of this arrangement, one form in Figs. 1 and 3, the other in Fig. 4 where the fingers themselves are reinforced below instead of being reinforced by the apron.

The operation of the compression ring is important because it must at all times closely grip the piston sleeve and also retain its potion in the groove. The modification in Figs. 6 and 7 does this because while when the piston is in the ring is drawn slightly away from the bearing block still at a distance comparatively slight and only a small part of the ring and block projects above the top of the groove so that the space through which the steam can pass is very slight. However Figs. 6 and 7 show means for overcoming this slight discrepancy.

In my arrangement then it will be understood that the light, simple valve piston weighing approximately 400 instead of 800 lbs. is reciprocated by the valve mechanism in the usual manner at about 800 strokes per minute as a maximum and the steam is held by the fixed packing rings which float in the valve chest and are in slidable and constant and even engagement with the piston valve so that they compensate for and render unimportant any differential expansion or change in shape of the irregular shaped casting forming the valve chest.

Broadly considering then the operation of my device or valve is by means of a reciprocating or removable or slidable cylindrical valve member operating across valve ports the ports being bounded or protected by compression rings which are in slidable contact with the simple cylindrical valve member and the valve may be moved either by a locomotive valve gear or by any other suitable mechanism. It may be made to reciprocate rapidly or slowly or may be merely occasionally moved when variations are desired. The movement of the valve piston or cylinder controls directly the relative opening of the ports so that the control is at all times positive, direct and accurate.

When the size of the split compression ring is properly adjusted with respect to the size of the valve cylinder, it will be obvious that when the high spots have been worn off and the ring and cylinder worn down to a perfect fit, if then the clearance at the end of the valve ring is correctly proportioned you will have a true circular valve ring which cannot contract any further and which surrounds the valve cylinder and results in a perfect plug valve. In other words, when the ring is in its ultimate collapsed position with the ends of the ring abutting either one another or the bearing plug, the result is such a plug valve arrangement.

I have used the term "driving connection" and by it I mean, of course, the valve stem which is pivoted or otherwise flexibly attached by a knuckle joint or other suitable mechanism to the valve cylinder.

In practice to meet modern conditions a distribution piston valve, for locomotives especially, is almost invariably of the inside admission type. To be practically operative a circulating passage must be provided through the valve from end to end so that the exhaust steam will not alternately cause a shock against said end of the valve. By my arrangement thus wherein the valve is made up of three concentric cylinders one small one adjoining the two large ones, I get this circulation passage through the valve from end to end.

In assembling my device, since the housing is rigid, the ring must collapse to be sprung into position. Experience shows that the only practical way to do this is to cut away a portion of the periphery of the ring, thus allowing it to collapse when compressed, so that its outside diameter will be less than the inside diameter of the housing. When the spring action reasserts itself and the ring is sprung back into place, a gap is left. This gap is considerable, and must be filled, and thus the filling piece is necessary. This arrangement and use of the filling piece, of course, permits its use as a separate bearing block for the weight of the valve, and thus the ring is continuous and held by the block which forms the bearing for the valve and an abutment for the ring to prevent its collapsing beyond its predetermined diameter under the pressure of the steam which seats it. This removable bearing being arranged at the bottom of the valve chamber and beneath the center line of the valve, may be comparatively narrow for the valve is largely balanced upon it.

It will be noted that the compression rings $B^5$ are provided about their inner edges, each with a flange so that the ring is in cross section so to speak L shaped. This flange is on the inside of the ring. Its purpose is of course to carry the effective edge of the ring over to the true port edge because the ring itself cannot be at the port edge owing to the necessity of having sufficient material there to support the ring.

I claim:

1. The combination with a cylindrical distribution valve for steam engines and the like of a valve chamber therefor having a removable bearing block therein beneath the center line of the valve.

2. The combination with a cylindrical distribution valve for steam engines and the like of a valve chamber therefor having a removable bearing block therein beneath the center line of the valve, said valve being supported on said bearing out of contact with the remainder of the steam chamber.

3. The combination with a cylindrical distribution valve for steam engines and the like of a valve chamber therefor having a removable bearing block therein beneath the center line of the valve, said valve being supported on said bearing out of contact with the remainder of the steam chamber, packing rings within said chamber interposed between it and the valve.

4. The combination with a cylindrical distribution valve for steam engines and the like of a valve chamber therefor having a removable bearing block therein beneath the center line of the valve, said valve being supported on said bearing out of contact with the remainder of the steam chamber, floating packing rings within said chamber interposed between it and the valve.

5. The combination with a cylindrical distribution valve for steam engines and the like of a valve chamber therefor having a removable bearing block therein beneath the center line of the valve, said valve being supported on said bearing out of contact with the remainder of the steam chamber, packing rings within said chamber interposed between it and the valve, and yieldingly gripping said cylinder.

6. The combination with a cylindrical distribution valve for steam engines and the like of a valve chamber therefor having a removable bearing block therein beneath the center line of the valve, said valve being supported on said bearing out of contact with the remainder of the steam chamber, floating packing rings within said chamber interposed between it and the valve, and yieldingly gripping said cylinder.

7. The combination with a cylindrical valve for fluid distribution and control of a valve chamber therefor having a bearing therein beneath the central portion of the valve together with a floating packing ring separate from said bearing and inclosing the valve.

8. The combination with a cylindrical valve for fluid distribution and control of a valve chamber therefor having a bearing therein beneath the central portion of the valve, said valve being supported on said bearing out of contact with the remainder of the steam chamber together with a floating packing ring separate from said bearing and inclosing the valve.

9. The combination with a cylindrical valve for fluid distribution and control of a valve chamber therefor having a bearing therein beneath the central portion of the valve, said valve being supported on said bearing out of contact with the remainder of the steam chamber, packing rings within said chamber interposed between it and the valve.

10. The combination with a cylindrical valve for fluid distribution and control of a valve chamber therefor having a bearing therein beneath the central portion of the valve, said valve being supported on said bearing out of contact with the remainder of the steam chamber, floating packing rings within said chamber interposed between it and the valve.

11. The combination with a cylindrical valve having a longitudinal circulating passage open from end to end thereof for fluid distribution and control of a valve chamber therefor having a bearing therein beneath the central portion of the valve, said valve being supported on said bearing out of contact with the remainder of the steam chamber, packing rings within said chamber interposed between it and the valve, and yieldingly gripping said cylinder.

12. The combination with a cylindrical valve having a longitudinal circulating passage open from end to end thereof for fluid distribution and control of a valve chamber therefor having a bearing therein beneath the central portion of the valve, said valve being supported on said bearing out of contact with the remainder of the steam chamber, floating packing rings within said chamber interposed between it and the valve, and yieldingly gripping said cylinder.

13. The combination with a cylindrical valve of a split compression piston ring in slidable engagement therewith, a bearing block for the valve intermediate the ends of the split piston ring and positioned to form a continuation thereof, the cross section of the circle bounded by the inner surface of such ring when in the collapsed position being substantially equal to the cross section of the circle bounded by the periphery of the valve cylinder.

14. A piston valve containing a split ring with an initial clearance placed so that the pressure tends to close the ring, the proportion of the parts being such that when worn to operative condition the ring is closed.

15. The combination with a valve cylinder of a compression ring surrounding it having initial clearance and means for compressing said ring to take up such clearance to make a snug fit between it and said valve, said ring being split and provided with a filling piece between its cut ends.

16. A piston valve comprising two concentric cylinders of equal diameter open at their ends and having ported side walls, a cylinder of smaller diameter concentric with and connecting them, said cylinder being flared at its ends to engage the inner periphery of the larger cylinders, the ports in the walls of the larger cylinders being arranged in two groups on either side of the contact circle between each larger and the smaller cylinder, said cylinder being flared at its ends to engage the inner side of the larger cylinders, a valve chest in which said cylinders are mounted for reciprocation, valve passages controlled thereby, and means for reciprocating the cylinder pivotally connected to the smaller cylinder.

In testimony whereof, I affix my signature, in the presence of two witnesses, this 11th day of January, 1915.

OTIS W. YOUNG.

Witnesses:
LAUREL M. DOREMUS,
BESSIE S. RICE.

Copies of this patent may be obtained for five cents each, by addressing the "Commissioner of Patents, Washington, D. C."